(12) United States Patent
Bushnell et al.

(10) Patent No.: US 7,631,637 B2
(45) Date of Patent: Dec. 15, 2009

(54) SYSTEM FOR IMPROVING FUEL UTILIZATION

(75) Inventors: Raymond Bryce Bushnell, Beavercreek, OR (US); Anthony Dean, Golden, CO (US); Danny Robert Lewis, Beavercreek, OR (US)

(73) Assignee: Vapor Fuel Technologies, LLC, Beavercreek, OR (US)

( * ) Notice: Subject to any disclaimer, the term of this patent is extended or adjusted under 35 U.S.C. 154(b) by 148 days.

(21) Appl. No.: 11/421,698

(22) Filed: Jun. 1, 2006

(65) Prior Publication Data

US 2007/0277791 A1 Dec. 6, 2007

(51) Int. Cl.
F02M 31/00 (2006.01)
(52) U.S. Cl. .................................................. 123/557
(58) Field of Classification Search .......... 123/543–557
See application file for complete search history.

(56) References Cited

U.S. PATENT DOCUMENTS

| | | | |
|---|---|---|---|
| 2,434,346 A | 1/1948 | Breese | |
| 3,442,632 A | 5/1969 | Mayland | |
| 3,468,641 A | 9/1969 | Gross | |
| 3,471,274 A | 10/1969 | Quigley | |
| 3,572,297 A | 3/1971 | Murray | |
| 3,792,688 A | 2/1974 | Grainger | |
| 3,799,124 A | 3/1974 | Swain | |
| 3,897,757 A | 8/1975 | Abello | |
| 3,963,000 A | 6/1976 | Kosaka | |
| 3,995,421 A | 12/1976 | Kuroiwa | |
| 3,995,600 A | 12/1976 | DeLuca | |
| 4,016,837 A | 4/1977 | Wentworth, Jr. | |
| 4,022,173 A * | 5/1977 | Read ........................ | 123/557 |
| 4,047,512 A | 9/1977 | Hough et al. | |
| 4,079,703 A | 3/1978 | Yamane | |
| 4,086,878 A | 5/1978 | Eisele | |
| 4,099,499 A | 7/1978 | Giardini et al. | |
| 4,112,875 A | 9/1978 | Fletcher | |
| 4,112,889 A | 9/1978 | Harpman | |
| 4,141,326 A | 2/1979 | Wolber | |
| 4,161,931 A * | 7/1979 | Giardini et al. ............. | 123/552 |
| 4,181,100 A | 1/1980 | Yamane | |
| 4,193,755 A | 3/1980 | Guarnaschelli | |
| 4,213,433 A | 7/1980 | Day | |
| 4,257,366 A * | 3/1981 | Strem et al. ................. | 123/554 |
| 4,274,383 A | 6/1981 | Adams | |

(Continued)

FOREIGN PATENT DOCUMENTS

BR 1887 3/2007

(Continued)

OTHER PUBLICATIONS

Robert Felix, "A History of Vapor Carburetors," www.keelynet.com/energy/gunnhist.htm, ISSN 1464-6935; Jan. 31, 1999, 24 pgs.

Primary Examiner—M. McMahon
(74) Attorney, Agent, or Firm—Schwabe, Williamson & Wyatt

(57) ABSTRACT

A vapor fuel air mixture supply system for a combustion engine, whereby the mixture of air and fuel vapor is elevated in temperature prior to combustion. The liquid fuel may be vaporized in a fractionation process and further heated to enhance flame speed combustion and improve efficiency of the system.

21 Claims, 2 Drawing Sheets

U.S. PATENT DOCUMENTS

| | | | |
|---|---|---|---|
| 4,330,492 A | 5/1982 | Mohr | |
| 4,367,700 A | 1/1983 | Pace | |
| 4,368,712 A | 1/1983 | Jackson | |
| 4,370,870 A | 2/1983 | Kroh et al. | |
| 4,370,970 A | 2/1983 | Kunz | |
| 4,385,615 A | 5/1983 | Keane | |
| 4,389,981 A | 6/1983 | Meyer | |
| 4,395,994 A | 8/1983 | Goto et al. | |
| 4,458,634 A | 7/1984 | Carr | |
| 4,458,653 A * | 7/1984 | Geddes et al. | 123/557 |
| 4,508,064 A | 4/1985 | Watanabe | |
| 4,605,837 A * | 8/1986 | Chen | 219/206 |
| 4,622,924 A | 11/1986 | Lewis | |
| 4,627,405 A | 12/1986 | Imhof et al. | |
| 4,628,871 A | 12/1986 | Glass | |
| 4,646,702 A | 3/1987 | Matsubara et al. | |
| 4,665,879 A | 5/1987 | Earl | |
| 4,781,165 A | 11/1988 | Rawlings | |
| 4,807,584 A | 2/1989 | Davis | |
| 4,862,859 A | 9/1989 | Yunick | |
| 4,881,507 A | 11/1989 | San Filipo | |
| 4,953,514 A | 9/1990 | Beicht | |
| 4,955,351 A | 9/1990 | Lewis | |
| 5,048,501 A * | 9/1991 | Smith et al. | 123/554 |
| 5,085,176 A | 2/1992 | Brinkley, III | |
| 5,088,452 A | 2/1992 | Iwaki | |
| 5,092,281 A | 3/1992 | Iwaki | |
| 5,115,768 A | 5/1992 | Peschka | |
| 5,119,768 A | 6/1992 | Russell | |
| 5,140,966 A | 8/1992 | Wong | |
| 5,178,118 A | 1/1993 | Nakamats | |
| 5,183,011 A | 2/1993 | Fujii | |
| 5,226,400 A | 7/1993 | Birch | |
| 5,282,497 A | 2/1994 | Allison | |
| 5,293,857 A | 3/1994 | Meyer | |
| 5,357,908 A | 10/1994 | Sung et al. | |
| 5,359,968 A | 11/1994 | Shiraishi | |
| 5,363,828 A | 11/1994 | Yamashita | |
| 5,398,663 A | 3/1995 | Kulasinghe | |
| 5,408,973 A * | 4/1995 | Spangjer | 123/478 |
| 5,438,961 A | 8/1995 | Peschka | |
| 5,462,021 A | 10/1995 | Minami | |
| 5,548,952 A | 8/1996 | Stock | |
| 5,603,290 A | 2/1997 | Swain | |
| 5,743,080 A | 4/1998 | Ginter | |
| 5,752,157 A | 5/1998 | Yamashita | |
| 5,765,538 A | 6/1998 | Krimmer | |
| 5,782,225 A | 7/1998 | Caggiano | |
| 5,816,223 A | 10/1998 | Jamrog | |
| 5,832,718 A | 11/1998 | Suttrop | |
| 5,890,472 A | 4/1999 | Saito | |
| 5,899,188 A | 5/1999 | Firey | |
| 5,934,260 A | 8/1999 | Gadkaree | |
| 5,944,003 A | 8/1999 | Osanai | |
| 5,946,916 A | 9/1999 | Ven | |
| 5,967,113 A | 10/1999 | Kaneko et al. | |
| 5,979,418 A | 11/1999 | Saruwatari | |
| 6,003,312 A | 12/1999 | Schlichtig | |
| 6,015,133 A | 1/2000 | DeLand | |
| 6,044,831 A | 4/2000 | Takagi | |
| 6,053,153 A | 4/2000 | Moser | |
| 6,067,966 A | 5/2000 | Saito | |
| 6,076,355 A | 6/2000 | Ven | |
| 6,095,121 A | 8/2000 | Osanai | |
| 6,116,221 A | 9/2000 | Matsumoto | |
| 6,119,651 A | 9/2000 | Anderson | |
| 6,138,644 A | 10/2000 | Saruwatari | |
| 6,138,655 A | 10/2000 | Kerns | |
| 6,155,239 A | 12/2000 | Dykstra | |
| 6,295,973 B1 | 10/2001 | Yang | |
| 6,494,192 B1 | 12/2002 | Capshaw et al. | |
| 6,681,749 B2 | 1/2004 | Bushnell | |
| 6,820,864 B2 | 11/2004 | Amou et al. | |
| 6,880,541 B2 | 4/2005 | Hanazaki et al. | |
| 6,907,866 B2 * | 6/2005 | Bushnell et al. | 123/546 |
| 6,966,308 B2 * | 11/2005 | Bushnell et al. | 123/546 |
| 7,028,675 B2 * | 4/2006 | Bushnell et al. | 123/546 |
| 7,380,546 B2 | 6/2008 | Bushnell et al. | |
| 2004/0144370 A1 * | 7/2004 | Mey et al. | 123/527 |
| 2004/0170936 A1 | 9/2004 | Weclas et al. | |
| 2004/0191710 A1 | 9/2004 | Velke | |
| 2004/0255882 A1 | 12/2004 | Branyon et al. | |
| 2006/0263731 A1 | 11/2006 | Hasegawa et al. | |
| 2008/0032245 A1 | 2/2008 | Bushnell et al. | |
| 2008/0190400 A1 | 8/2008 | Bushnell et al. | |

FOREIGN PATENT DOCUMENTS

| | | |
|---|---|---|
| CN | 1902390 | 2/2007 |
| CN | 101137833 | 3/2008 |
| EP | 1700020 | 9/2006 |
| EP | 1853810 | 11/2007 |
| JP | 1982-57-011254 | 6/1980 |
| JP | 1995-07-189834 | 7/1995 |
| JP | 2001-193525 | 7/2001 |
| JP | 2006002694 | 5/2006 |
| JP | 2007510857 | 4/2007 |
| WO | WO2009006177 | 1/2009 |

* cited by examiner

SYSTEM FOR IMPROVING FUEL UTILIZATION

FIELD OF INVENTION

This invention relates to a system for providing vaporized fuel to engines.

BACKGROUND AND BRIEF DESCRIPTION

Vehicles powered by vaporized fuel, such as gasoline, have been the subject of numerous patents over many years. Examples include co-owned U.S. Pat. Nos. 6,681,749 and 6,907,866. The disclosures of such patents are incorporated herein by reference.

Vaporizing the fuel prior to entrance to the cylinder can lead to improved performance, particularly with respect to substantially improved fuel economy. Running an engine "lean" (i.e., at an air to fuel ratio of greater than 15:1) can lead to improved fuel economy. Accordingly, vaporizing the fuel prior to entering the combustion chamber of the engine allows the engine to run at much higher air to fuel ratios than a conventional engine, which in turn leads to improved fuel economy.

It has been learned, however, that a potential issue may arise with operating at the larger air-to-fuel ratios, in that an undesired increase $NO_x$ emissions may result. This is due in part to the fact that the conventional catalyst on an automobile with a gasoline engine is designed to remove $NO_x$ with the engine operating at around a 15:1 air/fuel ratio.

However, applicants have found that the amount of $NO_x$ actually produced by the engine decreases as the air/fuel ratio increases, and the increase in emissions is a result of the fact that the catalyst cannot reduce even the smaller amount of $NO_x$ produced under these conditions. Thus, applicants have learned that by operating an engine at a sufficiently high air/fuel ratio, the amount of $NO_x$ formed would be sufficiently low such that the engine could meet emissions requirements, even with a catalyst that was not operating at its optimal conditions (e.g. air to fuel ratio).

Embodiments of the present invention disclose ways to operate a combustion engine at these higher air-fuel ratio (e.g., about greater than 21:1) such that the level of NOx emitted can satisfy existing regulations. One of the advantages of such operation may be that the high air-fuel ratio can allow for substantial improvements in fuel economy. As catalyst technology employed in vehicles improves, however, the embodiments of the present invention may be used to improve fuel economy with other air-fuel ratios (e.g., between 15:1 and 21:1) and still meet emission standards.

Liquid fuel may be viewed as being comprised of fractions that may vaporize at different temperatures. This vaporization can be achieved by initial heating of liquid fuel at a first temperature (e.g. 70° F.) and subsequently increasing the temperature as the differing fractions of the liquid fuel are vaporized and/or decreased vaporization of the fuel is detected. Referred to as fractionation, applicants have learned that generally sequentially supplying fractions of vapors to the combustion chamber may improve efficiency.

Further, through observation and testing, applicants have discovered that vaporized fuel being conveyed to the engine's combustion chamber may be subject to condensation during such conveyance. This can happen, for example, as a result of ambient air that has a temperature below that of the liquid fuel vaporization temperature being mixed with the fuel vapors to lean out the mixture to achieve the desired air:fuel ratio. This may cause the fuel vapors to in part condense and form liquid droplets. To help achieve improved performance, embodiments of the present invention may help to avoid such condensation by elevating the temperature of the vapor and air mixture to a point above that required for vaporization so that the fuel remains in a vaporized form. In other embodiments, the ambient air that is to be mixed with the vaporized fuel may be preheated.

Further such heating of the air supply, vaporized fuel, and/or air-vaporized fuel mixture may also further enhance the flame speed of the fuel/air mixture. This in turn can extend the "lean limit" (i.e., the highest air: fuel ratio where the engine can perform satisfactorily, without excessive loss of power, misfire, and/or unacceptable hydrocarbon emissions). This extension of the lean limit may have several advantages, including, but not limited to: (1) It improves fuel economy. (2) It decreases the amount of NOx produced.

It is further helpful to elevate the temperature of the ambient air that is mixed with and conveys the fuel vapors from the vaporization chamber prior to entry into the combustion chamber of the engine. As will be discussed more fully hereafter, the mixed air/fuel from the vaporization chamber is further diluted with ambient air, and such further ambient air is also heated whereby the diluted vaporized fuel mixture, upon entering the combustion chamber, is elevated above the temperature of the non-diluted mixture conveyed from the vaporization chamber. As described above, this heating of the air/fuel mixture may help to achieve some of the benefits that improve engine performance, including preventing condensation of the fuel and increasing the flame speed.

BRIEF DESCRIPTION OF THE DRAWINGS

Embodiments in accordance with the present invention will be more fully understood and appreciated by reference to the following detailed description and the accompanying drawings.

DETAILED DESCRIPTION OF EMBODIMENTS OF THE INVENTION

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use orientation and/or perspective-based descriptions such as up/down, back/front, and top/bottom. Such descriptions are merely used to facilitate the discussion and are not intended to restrict the application of embodiments of the present invention.

The description may use phrases such as "in an embodiment," or "in embodiments." such phrases may each refer to one or more of the same or different embodiments. Furthermore, the terms "comprising," "including," "having," and the like, as used with respect to embodiments of the present invention, are synonymous.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
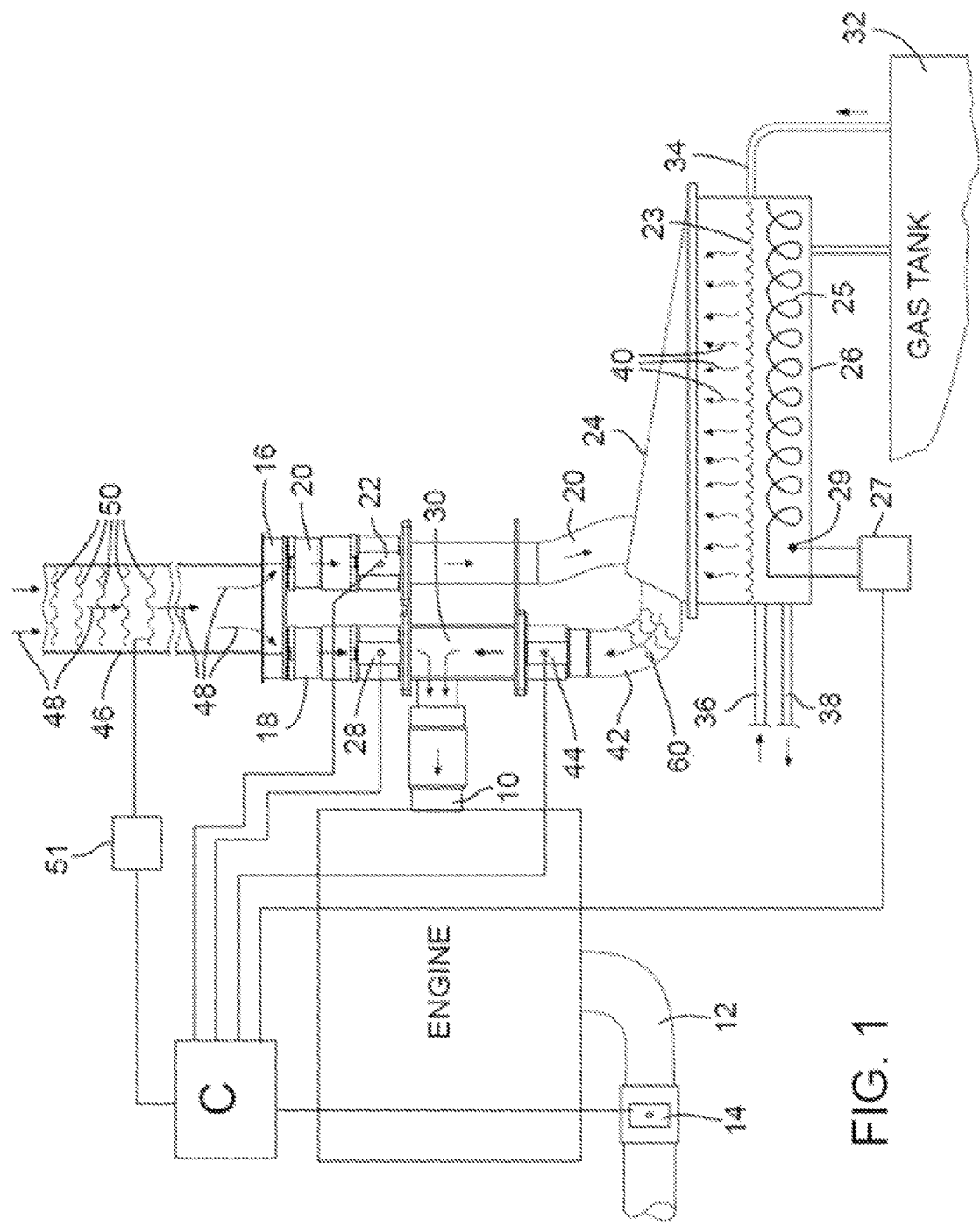
FIG. 1 is a schematic illustration of a vaporized fuel engine including a source of heated ambient air in accordance with the invention.

Reference is made to FIG.1, which provides a schematic overview of the components of a system in accordance with embodiments of the present invention. A powered engine as labeled, may include an intake port 10 connected to the engine's throttle body. The engine, when operating, may draw air and fuel through port 10. The engine may also includes an exhaust pipe 12 that is equipped with a senor 14 adapted to detect O2 and/or other emissions.

In one embodiment, air box 16 may allow the supply of ambient air to the system when operating the engine. Air conducting conduits 18 and 20 coupled to air box 16 may bifurcate the inflow of ambient air and provides the desired air supply to the remainder of the system. In other embodiments, the conduits 18 and 20 may be coupled to separate air supplies. Conduit 20 may include a valve 22 which controls the volume of air directed through conduit 20. Conduit 20 may be further coupled to vaporizing chamber 26 via, e.g., the top or cover 24, and thus configured to supply air to vaporizing chamber 26.

Conduit 18 may be coupled to a mixing chamber 30 and include a valve 28 that may be configured to controls the volume of ambient supplied to mixing chamber 30. Mixing chamber 30 may be any volume where air and vapor fuel are brought together, such as a chamber, confluence, and the like.

In one embodiment, vaporization chamber 26 may include a flow control apparatus e.g. baffles, which can direct airflow from conduit 20 through the vaporization chamber and into conduit 42. Liquid fuel 23 may be drawn from a fuel tank 32 via conduit 34. Heating element 25 may be coupled to vaporization chamber 26 and adapted to controllably heat the liquid fuel to generate fuel vapors 40. A number of heating sources may be used to controllably heat the liquid fuel, including, but not limited to engine component proximity, engine fluids (water, oil, etc.), electrical circuits, and other independent heating devices.

The vapors 40 may be carried by the air flow from air conduit 20, such that the air-fuel vapor mixture may be directed out through conduit 42 to the mixing chamber 30. In one embodiment, the flow of the air-fuel vapor through conduit 20 may be controlled by valve 44.

In one embodiment, the air-fuel vapor mixture of conduit 42 may be too rich, and must be further leaned with air. When this is the case, the air-fuel mixture may be intermixed (e.g. further leaned) in mixing chamber 30 with ambient air from conduit 18, and further directed through the intake port 10 and from there into the combustion chamber of the engine. The desired air to fuel ratio being supplied to the combustion engine may thus be controlled in several ways, including, but not limited to controlling the air supply to the combustion chamber, controlling the air supply to the mixing chamber, and increasing the rate of vaporization of the liquid fuel.

In one embodiment, it may be desirable to achieve an air to fuel ratio of at or above 26:1, which should yield NOx emissions that are substantially lower than those obtained at a lower air:fuel ratio and will meet today's emission standards. In another embodiment, operating with an air to fuel ratio below 26:1 will likely yield NOx emissions above today's acceptable emission standards. However, as catalyst technology or engine improvements (e.g., EGR) are employed, the air to fuel ratio achieved by embodiments of the present invention may be lower, yielding acceptable NOx levels, while still resulting improved fuel economy.

Assuming a specific hydrocarbon emission is desired, a reading of the emissions sensor may help to verify that the desired air to fuel ratio is achieved. However, it can be appreciated that a fixed setting will not likely achieve the optimum performance over any given period of time. Any temperature change, any elevational change and even differences in fuel make up may skew the vapor/fuel mixture flowing from the tank 26 to the mixing chamber 30.

Accordingly, the valves 22, 28, and 44 may be operated by, for example, stepper motors (not shown) controlled by computer C. Computer C may monitor the emissions in exhaust 12 and should those readings indicate that the levels of hydrocarbons are too high or too low, the computer may activate the appropriate stepper motors to change the relative fluid volumes of air from conduit 18, air from conduit 20 and the air-fuel vapor mixture of conduit 42. Should the reading show a too high hydrocarbon level, the vapor/air flow of conduit 44 may need to be lessened, e.g., the valve 44 may be closed, the valve 28 opened, and or both closing of valve 44 and opening of valve 28.

These adjustments may take place in stages (e.g., a partial closing of valve 44, a rereading of the emissions sensor followed by repeated further partial closing of valve 44, or alternatively the partial opening of valve 28, or a combination of both). In one embodiment, valve 22 can also be a factor, as restricting air flow into conduit 20 will slow the flow of air to the tank 26, thus to conduit 42, while also diverting more air flow through valve 28.

Embodiments of the present invention may include one or more additional heat sources that can allow for heating the air that may be supplied to the vaporization tank, the air that may be supplied to the mixing chamber, and/or the air and vaporized fuel mixture exiting the vaporizing chamber.

In one embodiment, a heat source 46 may control the temperature of the air flow 48 and elevate the temperature of the air supply as deemed necessary based on the content of the emissions. As illustrated, heat source 46 may be heating coils 50 disposed within the air flow 48. However, embodiments of the present invention may include a variety of heat sources, including heat generated from different components of the engine (e.g. the engine's manifold and/or engine fluids), as well as independent heat sources.

However provided, upon traversing the heat source 46, the air inflow 48 may be controllably elevated in temperature (e.g., controllably raising the typical ambient air temperature from a range of about 60° to 80° F. to a temperature of about 100° to 120° F.). Again, the amount the temperature of the air supply may vary depending on emission content and conditions, and may be controlled based thereon.

In one embodiment, control 27 may control the heat generation of heat element 25. Control 27 may also be coupled to and controlled by the computer C depending on the response in part to the emission detections by sensor 14. In one embodiment, the liquid fuel in the vaporization tank 26 may be vaporized and mixed with the air supply from conduit 20. This mixture may be directed to the mixing chamber 30 and further to the combustion chamber of the engine. As discussed above, the temperature of the liquid fuel may be increased enough to vaporize one fraction of the fuel 23 at a time. The temperature of the fuel 23 may then be raised to initiate vaporization of a second fraction, which in turn may be carried out of the vaporization chamber with the air supply, and so on.

While the air-fuel mixture is being conveyed to the mixing chamber, there may be the possibility that a part of the mixture may condense to liquid form prior to entering the combustion chamber. In one embodiment, to prevent condensation from taking place (e.g. in the path through conduit 42 and mixing chamber 30), the air from conduit 20 may be elevated e.g. by heat source 46 to establish a temperature of the air at or above the temperature of the vapor 40. This may prevent condensation as the fuel is carried through conduit 42 and into the mixing chamber 30. A too high temperature of air from conduit 20, however, could undesirably overheat the liquid fuel 23 producing an undesired high rate of vaporization, which in certain embodiments, may affect the fractionation of the liquid fuel and alter the characteristics of the mixture. Thus the temperature of the air entering the vaporization chamber may be controlled to avoid this occurrence.

Because the air temperature may drop as it is conveyed from the heat source 46 and because the process of vaporization itself extracts energy, in one embodiment, there may be a balancing of the elevation of the air temperature. This may be monitored and controlled by temperature probes and controls.

In one embodiment, a heat source may be coupled to the conduit coupling the vaporization chamber and the mixing chamber and/or the combustion chamber. Such a heat source 60 may be controlled to in order to keep the temperature of the mixture sufficiently elevated and to resist condensation. In such a case, the air-vapor fuel mix may be subjected to a further temperature increase without concern for impacting the fractionation process.

In one embodiment, the temperature of the air supply to the mixing chamber 30 may be elevated by heat source 46 in order to further heat the air-fuel mixture prior to being conveyed into the combustion chamber of the engine via intake port 10. This may help to improve burning efficiency as well as prevent condensation in the mixing chamber itself.

Elevation of the temperature of vapor fuel mixture being directed through intake port 10 can be achieved and/or augmented in a variety of ways that are separate from, complementary to and/or in addition to those described above. In one embodiment, the relationship of the heat sources to the vaporization chamber and the mixing chamber can impact the heating of the air-fuel vapor mixture. For example, if the relationship of the heat source 46 to the vaporization chamber 26, as compared to the mixing chamber 30 results in a longer conveyance path to the vaporization chamber, this may result in an undesired drop in the temperature. A shorter distance through conduit 18 into mixing chamber 30 may thus provide the desired elevation in temperature to the vaporized fuel conveyed to the combustion chamber.

In various other embodiments, heat may be applied to various components of the system to help elevate the temperature of the air-fuel mixture prior to entering the combustion chamber to help improve efficiency and/or to help prevent condensation. Further, other alternatives are available and of course separate heat sources may be utilized at different locations in the system.

Figure 2:
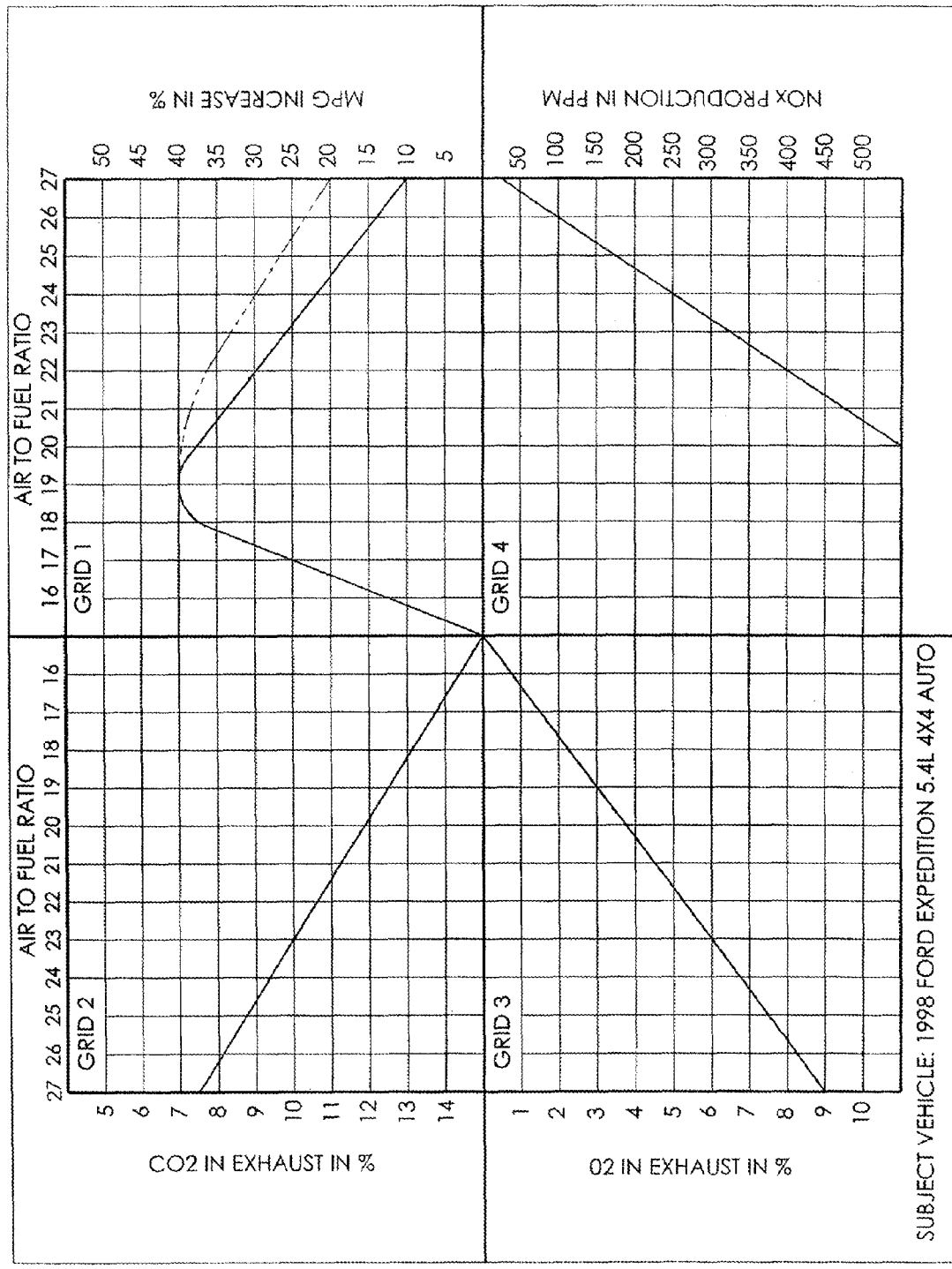
FIG. 2 is a compilation of charts demonstrating the benefits of the invention.

Reference is now made to FIG. 2 illustrates some of the beneficial result that may be achieved by employing embodiments of the present invention. An example of the combustion of vaporized fuel without the added heat is shown in solid lines in graph 1 and the heated fuel is shown in dashed lines. By increasing the temperature of the vapor, the ratio of air to fuel can be increased substantially without materially sacrificing the desired fuel economy. A distinct benefit of such elevation is the reduction of nitrogen oxide as demonstrated in graph 4. Graphs 2 and 3 illustrate the comparable reduction of $CO_2$ and increase in $O_2$.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A system, comprising:
    a combustion chamber;
    a vaporized fuel source coupled to the combustion chamber, wherein the vaporized fuel source includes a first heat source configured to heat a quantity of liquid fuel to a first temperature to vaporize a first fraction of the quantity of liquid fuel and, in response to a detected event, to increase the first temperature to a second temperature to vaporize a second fraction of the quantity of liquid fuel;
    controls adapted to control mixture of the first fraction and the second fraction from the vaporized fuel source with air flow from an air source to generate a first mixture and a second mixture and sequentially direct the first and second mixtures to the combustion chamber; and
    a second heat source configured to elevate the temperature of the first fraction and the second fraction prior to conveyance into the engine's combustion chamber.

2. A system as defined in claim 1, wherein the quantity of liquid fuel comprises fewer fractions after the vaporization of the first fraction, and the first heat source is controlled in order to increase the temperature of the quantity of liquid fuel to achieve a desired fractionation of the quantity of liquid fuel.

3. A system as defined in claim 1 wherein the air source is configured to direct the air flow to the vaporized fuel source, and the second heat source is configured to heat the air flow prior to entering the vaporized fuel source.

4. A system as defined in claim 3 wherein the air source is configured to bifurcate the air flow into a first air flow directed to the vaporized fuel source and a second air flow directed to a mixing chamber to be introduced to the first and second mixtures.

5. A system as defined in claim 3 wherein a second air source is configured to direct a second air flow to a mixing chamber to sequentially mix with the first and second mixtures prior to entry into the combustion chamber.

6. A system as defined in claim 3, wherein the temperatures of the first and second mixtures leaving the vaporized fuel source are elevated by a third heat source.

7. The system as defined in claim 1, wherein the detected event is a decrease in vaporization at the first temperature.

8. A vaporized fuel system for an engine comprising:
a controllable heat source adapted to heat a quantity of liquid fuel contained within a vaporization chamber;
said liquid fuel comprising fractions having varying temperatures for vaporization and said controllable heat source adapted to increase a temperature of the quantity of liquid fuel to a first temperature to vaporize a first fraction, and in response to a detected event, increase the temperature of the quantity of liquid fuel from the first temperature to a second temperature to vaporize a second fraction;
conduits for conveying ambient air to be intermixed with the first and second fractions and then to said engine for combustion; and
a further heat source for heating said mixture of ambient air and vaporized fractions to a further elevated temperature.

9. The vaporized fuel system as defined in claim 8, wherein the detected event is a decrease in vaporization at the first temperature.

10. A vapor fuel supply system, comprising:
a mixing chamber coupled to a combustion chamber;
a vaporized fuel source coupled to the mixing chamber, the vaporized fuel source including a vaporization chamber and a liquid fuel heat source adapted to increase a temperature of a quantity of liquid fuel to a first temperature to vaporize a first fraction, and in response to a detected event, to further increase the temperature of the liquid fuel to a second temperature to vaporize a second fraction;
a fractionated fuel heat source coupled to the vaporized fuel source to elevate a temperature of the first and second fractions at a point downstream of the vaporization chamber and upstream of the combustion chamber;
one or more air sources coupled to and configured to provide an air supply to the vaporization chamber and/or the mixing chamber; and
an air supply heat source configured to controllably elevate a temperature of the air supply prior to the entry into the mixing chamber and/or the vaporization tank.

11. The vapor fuel supply system of claim 10, wherein the temperature of the air supply from the air source to the mixing chamber is controlled to elevate the temperature of the first and second fractions entering the mixing chamber to a temperature above the temperature of the first and second fractions leaving the vaporization chamber.

12. The vapor fuel supply system of claim 10 wherein the vaporization chamber and the mixing chamber are coupled to the same air source.

13. The vaporized fuel system as defined in claim 10. wherein the detected event is a decrease in vaporization at the first temperature.

14. A method, comprising:
heating a quantity of liquid fuel to a first temperature to form a first vaporized fuel fraction;
mixing said first vaporized fraction with an air supply to form a first mixture having a desired air to fuel ratio;
heating the quantity of liquid fuel to a second temperature in response to a detected event, wherein the second temperature generates a second vaporized fuel fraction;
mixing said second vaporized fuel fraction with the air supply to form a second mixture having a desired air to fuel ratio; and
heating the air supply, the first and second vaporized fuel fractions and/or mixtures to a temperature at or above the first and second temperatures, respectively prior to conveyance to a combustion engine.

15. The method of claim 14, wherein said air supply includes a first air supply and wherein said mixing said first and second vaporized fuel fractions with said air supply includes:
conveying said first air supply to a vaporization chamber to create a first mixture with the first vaporized fraction, and subsequently with the second vaporized fraction to create a second mixture, the first and second mixtures having a desired air to fuel ratio; and
conveying the first and second mixtures towards said combustion engine.

16. The method of claim 15, further comprising elevating the temperature of the first air supply prior to entry into the vaporization chamber.

17. The method of claim 15, wherein said air supply includes a second air supply, and further comprising:
conveying, sequentially, said first and second mixtures to a mixing chamber;
conveying the second air supply to said mixing chamber; and
mixing said first and second mixtures with said second air supply to form the desired air to fuel ratio.

18. The method of claim 17, further comprising elevating the temperature of the first and second mixture prior to entry into the mixing chamber.

19. The method of claim 17, further comprising elevating the temperature of the second air supply prior to the conveying to the mixing chamber.

20. The method of claim 14, wherein the heating comprises:
elevating a temperature of the quantity of liquid fuel with a heating element to produce the first vaporized fuel fraction and the second vaporized fuel fraction.

21. The method as defined in claim 14. wherein the heating the quantity of liquid fuel to the second temperature comprises heating the quantity of liquid fuel to the second temperature in response to detecting a decrease in vaporization at the first temperature.

* * * * *